(12) United States Patent
Shin et al.

(10) Patent No.: US 8,603,203 B2
(45) Date of Patent: Dec. 10, 2013

(54) BURNER NOZZLE ASSEMBLY AND FUEL REFORMER HAVING THE SAME

(75) Inventors: Woo-Cheol Shin, Yongin-si (KR); In-Hyuk Son, Yongin-si (KR); Jin-Goo Ahn, Yongin-si (KR); Jong-Rock Choi, Yongin-si (KR); In-Seob Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 379 days.

(21) Appl. No.: 12/924,336

(22) Filed: Sep. 24, 2010

(65) Prior Publication Data

US 2011/0250553 A1    Oct. 13, 2011

Related U.S. Application Data

(60) Provisional application No. 61/342,353, filed on Apr. 12, 2010.

(51) Int. Cl.
  *B01J 7/00*    (2006.01)
  *C01B 6/24*    (2006.01)
  *F23C 5/00*    (2006.01)
  *F23D 11/00*   (2006.01)

(52) U.S. Cl.
  USPC .............. 48/61; 431/8; 431/159; 423/644

(58) Field of Classification Search
  USPC .......................................... 48/61
  See application file for complete search history.

(56) References Cited

U.S. PATENT DOCUMENTS

| | | | | |
|---|---|---|---|---|
| 2,942,655 | A | | 6/1960 | Taylor |
| 3,531,263 | A | * | 9/1970 | Sederquist ................ 48/61 |
| 3,909,299 | A | * | 9/1975 | Corrigan .................. 422/629 |
| 4,430,304 | A | * | 2/1984 | Spurrier et al. ........... 422/204 |
| 4,504,447 | A | * | 3/1985 | Spurrier et al. ........... 422/204 |
| 4,861,348 | A | * | 8/1989 | Koyama et al. ............ 48/94 |
| 4,909,808 | A | * | 3/1990 | Voecks .................... 48/94 |
| 4,935,037 | A | * | 6/1990 | Koyama et al. ............ 48/94 |
| 5,639,431 | A | * | 6/1997 | Shirasaki et al. .......... 422/212 |
| 5,833,447 | A | | 11/1998 | Bodelin et al. |
| 5,882,184 | A | * | 3/1999 | Feldermann ............... 431/9 |
| 6,221,117 | B1 | | 4/2001 | Edlund et al. |

(Continued)

FOREIGN PATENT DOCUMENTS

| | | |
|---|---|---|
| CN | 1459584 A | 12/2003 |
| CN | 1839095 A | 9/2006 |

(Continued)

OTHER PUBLICATIONS

KIPO Office Action dated Jun. 15, 2012 for KR 10-2010-0109172 (6 pages).

(Continued)

*Primary Examiner* — Matthew Merkling
(74) *Attorney, Agent, or Firm* — Christie, Parker & Hale, LLP (57) ABSTRACT

A burner nozzle assembly includes: a nozzle plate having an anode off-gas (AOG) nozzle at the center of the nozzle plate and a plurality of oxidation fuel nozzles surrounding the AOG nozzle; and a channel unit coupling the AOG nozzle with an AOG introducer to allow an AOG to flow therebetween and coupling the oxidation fuel nozzles with an oxidation fuel introducer to allow an oxidation fuel to flow therebetween.

14 Claims, 8 Drawing Sheets
(1 of 8 Drawing Sheet(s) Filed in Color)

(56) References Cited

U.S. PATENT DOCUMENTS

| | | | |
|---|---|---|---|
| 8,157,189 B2* | 4/2012 | Johnson et al. | 239/132.5 |
| 2002/0006535 A1 | 1/2002 | Woods et al. | |
| 2003/0129555 A1* | 7/2003 | Mukai et al. | 431/187 |
| 2004/0105794 A1 | 6/2004 | Maenishi et al. | |
| 2004/0172877 A1* | 9/2004 | Wunning | 48/102 A |
| 2005/0136367 A1 | 6/2005 | Lee et al. | |
| 2005/0172553 A1* | 8/2005 | Zartenar et al. | 48/127.9 |
| 2006/0191200 A1 | 8/2006 | Maenishi et al. | |
| 2007/0151152 A1* | 7/2007 | Mukai et al. | 48/127.9 |
| 2007/0209642 A1* | 9/2007 | Schmidt | 123/527 |
| 2008/0081233 A1 | 4/2008 | Rechberger et al. | |

FOREIGN PATENT DOCUMENTS

| | | |
|---|---|---|
| EP | 1 205 710 A1 | 5/2002 |
| EP | 1 365 193 B1 | 11/2003 |
| JP | 2004-149407 A | 5/2004 |
| JP | 2005-180900 | 7/2005 |
| JP | 2006-002991 | 1/2006 |
| JP | 2007-261282 | 10/2007 |
| JP | 2009-120448 | 6/2009 |
| KR | 10-2009-0010402 | 1/2009 |
| KR | 10-0965436 | 6/2010 |
| WO | WO 03/089128 A1 | 10/2003 |
| WO | WO 2007/008973 A2 | 1/2007 |
| WO | WO 2010/025145 A1 | 3/2010 |

OTHER PUBLICATIONS

EPO Extended Search Report dated Aug. 11, 2011, for corresponding European Patent Application No. 10187555.7, 9 pages.
Japanese Office action for Application No. 2011-017854, issued Feb. 5, 2013, 2 pages.
KIPO Notice of Allowance dated Feb. 21, 2013, for corresponding Korean Patent application 10-2010-0109172, (2 pages).
SIPO Office action dated May 29, 2013, with English translation, corresponding to Chinese Patent application 201110090286.3, (22 pages).

* cited by examiner

BURNER NOZZLE ASSEMBLY AND FUEL REFORMER HAVING THE SAME

CROSS-REFERENCE TO RELATED APPLICATION

This application claims the benefit of U.S. Provisional Application No. 61/342,353, filed on Apr. 12, 2010, in the United States Patent and Trademark Office, the entire content of which is incorporated herein by reference.

BACKGROUND

1. Field

The following description relates to a burner nozzle assembly that can efficiently jet anode-off gas containing oxidation fuel and hydrogen to an oxidizer, and a fuel reformer having the same.

2. Description of Related Art

A steam reforming type reformer can be used to acquire high-concentration hydrogen from a fuel cell. A heat source is required because an endothermic reaction occurs in the steam reforming type reformer. Here, a flame type burner or a catalyst type burner may be used as the heat source.

In the flame type burner that is generally used for a home reformer structure, it is desirable to use a burner that can stably generate heat without extinguishing the flame.

Further, in the catalyst type burner, it is desirable to use a burner which does not cause or develop a hot spot in the catalyst and which does not backfire, that is, a burner which does not cause a flashback in a catalytic reaction starter. In particular, in a structure reusing anode-off gas (AOG) to improve the efficiency of a fuel cell, the structure for preventing or protecting from backfire is very important because the reactivity of the hydrogen contained in a large amount in the AOG gas is very high.

SUMMARY

Aspects of embodiments of the present invention are directed toward a member that improves efficiency and operational safety of a fuel reformer, by reusing highly-reactive hydrogen by burning anode-off gas.

Further, aspects of embodiments of the present invention are directed toward a burner that can efficiently mix and jet main fuel and anode-off gas.

Further, aspects of embodiments of the present invention are directed toward a member that can supply fuel mixture without generating backfire in a structure recycling AOG to the burner of a fuel reformer in order to increase efficiency of a fuel cell system.

In an embodiment of the present invention, a burner nozzle assembly includes: a nozzle plate having an anode off-gas (AOG) nozzle at the center of the nozzle plate and a plurality of oxidation fuel nozzles surrounding the AOG nozzle; and a channel unit coupling the AOG nozzle with an AOG introducer to allow an AOG to flow therebetween and coupling the oxidation fuel nozzles with an oxidation fuel introducer to allow an oxidation fuel to flow therebetween.

The sum of the discharge areas of the oxidation fuel nozzles may be one to three and a half times the discharge area of the AOG nozzle.

The AOG nozzle may have a diameter not greater than 2.5 mm, and each of the oxidation fuel nozzles may have a diameter not greater than 1.5 mm.

The channel unit may include: an AOG channel coupling the AOG nozzle with the AOG introducer to allow the AOG to flow therebetween; and an oxidation fuel channel separated from the AOG channel and coupling the oxidation fuel nozzles with the oxidation fuel introducer to allow the oxidation fuel to flow therebetween.

The oxidation fuel channel may include: a first portion having a circumferentially continuous annular channel configured to receive oxidation fuel from the oxidation fuel introducer; and a second portion having a plurality of discontinuous spaces configured to distribute the oxidation fuel to the oxidation fuel nozzles.

In another embodiment of the present invention, a reformer includes: a reforming unit; an oxidizing unit surrounding the reforming unit; and a burner nozzle assembly configured to mix an anode off-gas (AOG) with an oxidation fuel and to supply the mixed AOG and oxidation fuel to the oxidation unit, the burner nozzle assembly including a nozzle plate having an AOG nozzle at the center of the nozzle plate to supply the AOG to the oxidation unit and a plurality of oxidation fuel nozzles surrounding the AOG nozzle to supply the oxidation fuel to the oxidation unit.

The burner nozzle assembly may further include a channel unit coupling the AOG nozzle with an AOG introducer to allow the AOG to flow therebetween and coupling the oxidation fuel nozzles with an oxidation fuel introducer to allow the oxidation fuel to flow therebetween.

The reforming unit may include: a first part; a second part; and a reforming-reacting portion between the first part and the second part and configured to convert a main fuel into a reformate, the second part surrounding the first part and having a closed end portion facing the burner nozzle assembly, the first part having an open end portion facing the closed end portion of the second part and being configured to discharge the reformate.

The oxidizing unit may include: an oxidizing unit body surrounding the second part of the reforming unit; and an oxidizing portion between the second part of the reforming unit and the oxidizing unit body.

The oxidizing portion may include an oxidizing catalyst.

The reformer nozzle plate of the burner nozzle assembly may be separated from the closed end portion of the reforming unit by a gap therebetween and may seal an end of the oxidizing unit.

The oxidizing unit may include: a mixed fuel plate facing the nozzle plate of the burner nozzle assembly and having a plurality of mixed fuel nozzles surrounding the center of the mixed fuel plate, the mixed fuel nozzles being separated from the nozzle plate of the burner nozzle assembly by a gap therebetween.

The mixed fuel nozzles may be further away from the central axis of the reformer than the oxidation fuel nozzles are away from the central axis of the reformer.

The oxidizing unit may have a first end portion facing the burner nozzle assembly, the first end portion being angled toward the central axis of the reformer; and the reforming unit may have a second end portion facing the burner nozzle assembly, the second end portion being angled away from the central axis of the reformer, wherein the mixed fuel nozzles may be between the first end portion and the second end portion.

The first end portion and the second end portion may define a first cross sectional annular area distal to the mixed fuel nozzles and a second cross sectional annular area proximal to the mixed fuel nozzles, and the first area may be larger than the second area.

The first end portion and the second end portion may further define a third area between the first area and the second area, the third area may be larger than the second area, and the first area may be larger than the third area.

The sum of the discharge areas of the mixed fuel nozzles may be one to four times the sum of the discharge areas of the oxidation fuel nozzles and the discharge area of the AOG nozzle.

The reformer may further include an evaporator configured to apply heat of exhaust discharged from the oxidizing unit to convert water into steam and to supply the steam into the reforming unit.

The sum of the discharge areas of the oxidation fuel nozzles may be one to three and a half times the discharge area of the AOG nozzle.

The AOG nozzle may have a diameter not greater than 2.5 mm, and each of the oxidation fuel nozzles may have a diameter not greater than 1.5 mm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Hereinafter, exemplary embodiments of the present invention will be described with reference to the accompanying drawings. The terms representing directions such as "up, down, left, right" used herein are considered to be based on the relationships shown in the drawings, if not specifically defined or stated. Further, the same reference numerals represent the same parts throughout the embodiments.

Typical fuel cells include: a fuel converter (reformer and reactor) for reforming and supplying fuel; and a fuel cell module. The fuel cell module includes a fuel cell stack for converting chemical energy into electrical energy and thermal energy in an electrochemical reaction.

Embodiments of the present invention relate to an oxidizing unit for supplying heat to a reformer and a burner nozzle assembly for supplying oxidation fuel to the oxidizing unit. Hereafter, embodiments of the present invention are described in more detail.

EXAMPLE 1

Figure 1:
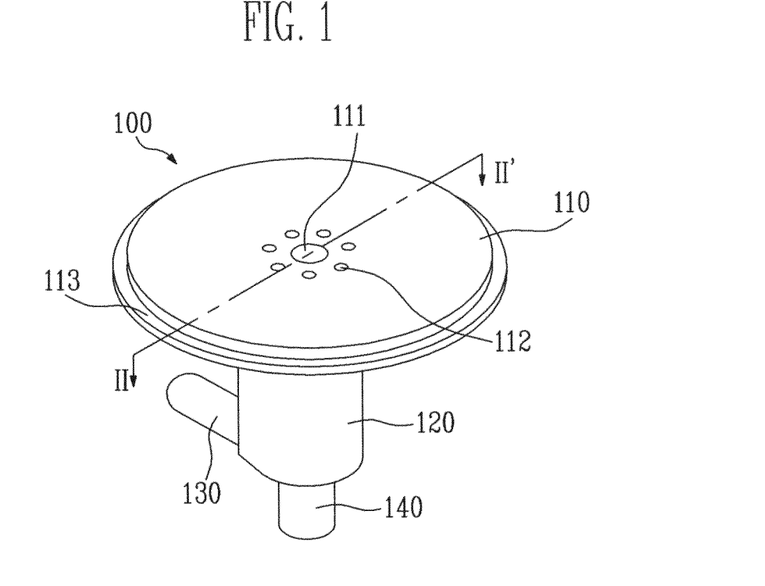
FIG. 1 is a perspective view showing a burner nozzle device according to an embodiment of the present invention.
Figure 2A:
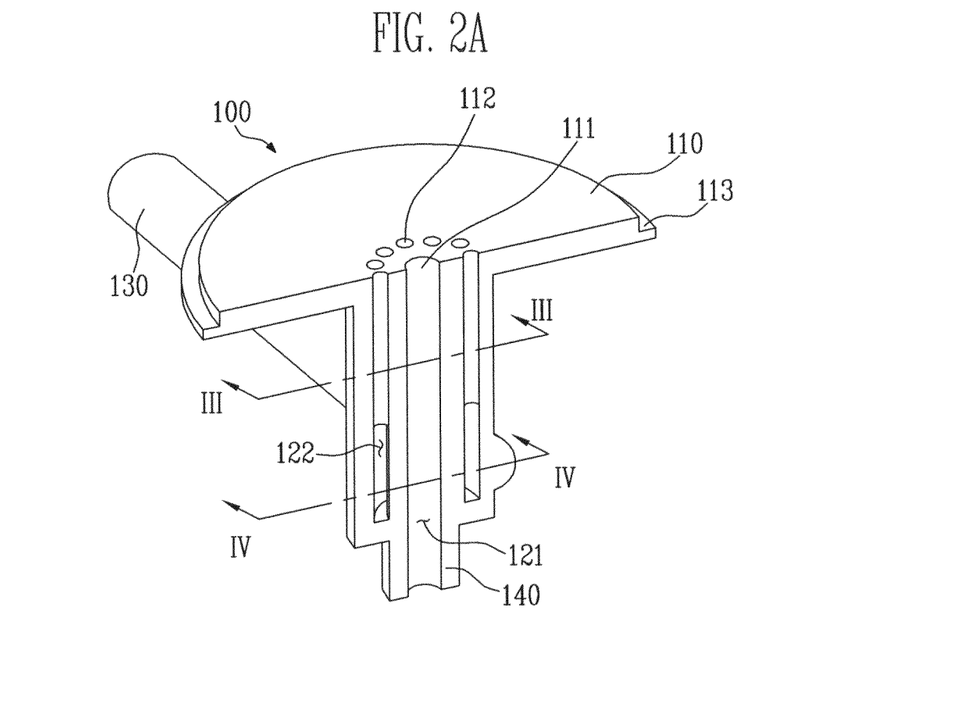
FIG. 2A is a perspective view cut along line II-II' of FIG. 1.
Figure 2B:
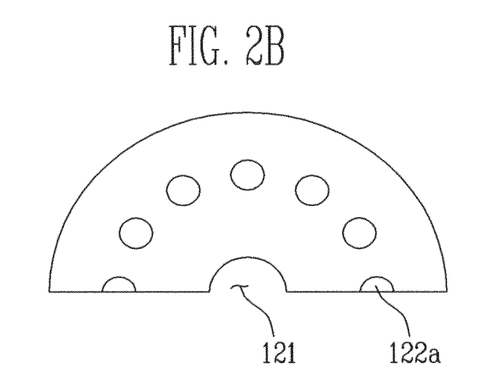
FIG. 2B is a perspective view cut along line III-III' of FIG. 2A.
Figure 2C:
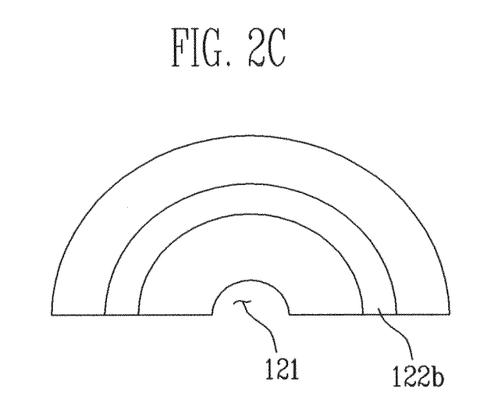
FIG. 2C is a perspective view cut along line IV-IV' of FIG. 2A.
Figure 3:
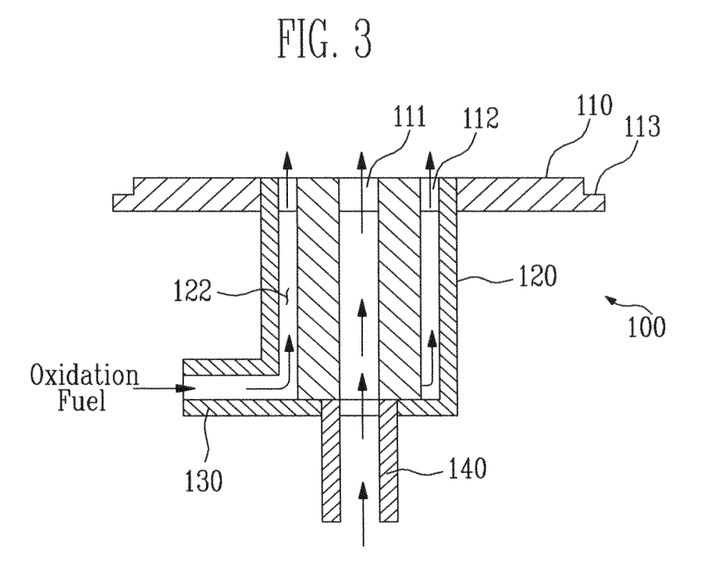
FIG. 3 is a cross-sectional view showing a burner nozzle according to an embodiment of the present invention.

A burner nozzle assembly 100 is first described with reference to FIGS. 1 to 3. The burner nozzle assembly 100 can be divided into a nozzle plate 110, a channel unit 120, an oxidation fuel introducer 130, and an AOG introducer 140.

Figure 4:
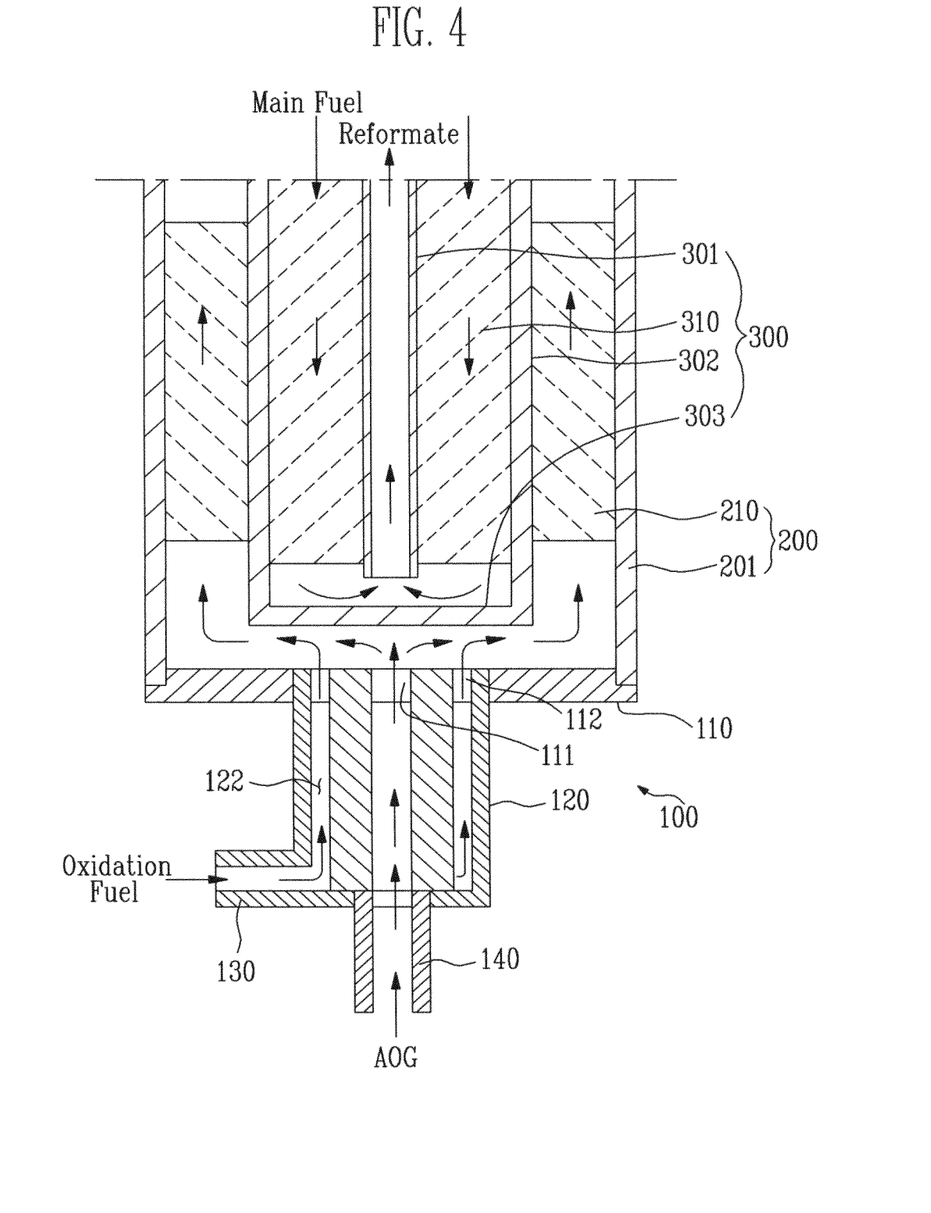
FIG. 4 is a schematic cross-sectional view showing a fuel converter according to an embodiment of the present invention.

The oxidation fuel introducer 130 and the AOG introducer 140 are pipes through which fuel is supplied to an oxidizing unit 200 (see FIG. 4). The oxidation fuel is supplied to the burner nozzle assembly 100 through the oxidation fuel introducer 130, and the AOG generated in the operation of the fuel cell is supplied to the burner nozzle assembly 100 through the AOG introducer 140.

The nozzle plate 110 is formed as a circular plate or may be a plate having another suitable shape (or predetermined shape). The nozzle plate 110 may be made of a heat resistant material that can endure high temperatures of about 1000° C. The AOG nozzle 111 and the oxidation fuel nozzles 112 are bored through the nozzle plate 110. The AOG nozzle 111 is formed at the center of the nozzle plate 110, and the oxidation fuel nozzles 112 are disposed radially at a distance (e.g., a predetermined distance) from the center of the AOG nozzle 111. Further, the AOG and the oxidation fuel are supplied into the oxidizing unit 200 through the AOG nozzle 111 and the oxidation fuel nozzles 112, respectively.

The channel unit 120 is described with reference to FIGS. 2A to 3. FIG. 2B is a transverse cross-sectional view taken along line III-III' FIG. 2A, and FIG. 2C is a transverse cross-sectional view taken along line IV-IV' in FIG. 2A. The channel unit 120 is formed by inserting a pipe from the oxidation fuel introducer 130 and the AOG introducer 140 to the AOG nozzle 111 and the oxidation fuel nozzles 112 formed in the nozzle plate 110, or the channel unit 120 has connecting channels therein. As shown in FIG. 3, the AOG is delivered from the AOG introducer 140 to the AOG nozzle 111 through an AOG channel 121. The oxidation fuel is distributed and delivered to each of the oxidation fuel nozzles 112 from the oxidation fuel introducer 130 through oxidation fuel channels 122. In addition, the oxidation fuel channel 122, as shown in FIGS. 2B and 2C, may have different upper and lower structures. That is, the lower portion 122b of the oxidation fuel channel may have a space that can provide a circumferentially continuous channel to receive oxidation fuel and deliver it under each of the oxidation fuel nozzles 112, and the upper portion 122a of the oxidation fuel channel may have a plurality of discontinuous spaces to distribute and deliver the oxidation fuel from the lower portion 122b of the oxidation fuel channel to each of the oxidation fuel nozzles 112. However, in one embodiment of the present invention, because the configuration and position of the AOG nozzle 111 and the oxidation fuel nozzles 112 on the nozzle plate 110 are important to the design of the burner nozzle assembly 100, in the same operational range it is possible to suitably modify the configuration of the oxidation fuel introducer 130, the configuration of the AOG introducer 140, the configuration of the channel unit 122, and the connection relationships of (or between) them.

The oxidizing unit 200 and the reformer 300 are described with reference to FIG. 4. For the sake of convenience, the configuration of an igniter is not shown.

A reformer 300 is provided for acquiring (or providing) hydrogen, which is produced from hydrocarbon-based fuel (hereafter referred to as "main fuel") and is directly used to produce electricity in a fuel cell. In a steam reforming type reformer (which is one type of a plurality of types of reformers), although it is possible to increase the output of the cell and to produce high-concentration hydrogen, the endothermic reaction requires heat from an outside source, which is supplied by the oxidizing unit 200.

The reformer 300 is formed of a double hollow container. A second part (e.g., an outer pipe) 302, the outermost part of the reformer, is closed at its lower end by a reformer lower plate (or closed end portion) 303 facing the reformer lower plate 110, and a first part (e.g., an inner pipe) 301 has an open lower end facing the closed end portion 303. The main fuel undergoes a steam reforming reaction while flowing down through a reforming-reacting portion 310 disposed between the first part 301 and the second part 302, and then is delivered upward through the first part 301, which is configured to discharge the reformate.

The oxidizing unit 200 of this embodiment has a hollow cylindrical shape, and its lower end is closed by the nozzle plate 110. The reformer 300 is disposed inside the oxidizing unit 200. In this configuration, the reformer lower plate 303 maintains a distance (e.g., a predetermined distance) from the nozzle plate 110 and the second part 302 also maintains a distance (e.g., a predetermined distance) from the oxidizing unit body 201. The AOG and the oxidation fuel discharged from the AOG nozzle 111 and the oxidation fuel nozzles 112 flow through the space defined between the reformer 300 and the oxidizing unit body 201.

The AOG and the oxidation fuel are mixed and flow upward along the space between the second part 302 and the oxidizing unit body 201 after passing under the reformer lower plate 303, and then oxidizes and generates heat in the oxidizing portion 210 between the second part 302 and the oxidizing unit body 201. At least any one of $PdAl_2O_3$, NiO, CuO, $CeO_2$, $Al_2O_3$, Rh, Pd, and Pt and equivalents and combinations thereof can be used as a catalyst in the oxidizing portion 210. For the sake of convenience, the configuration of the upper portions of the oxidizing unit 200 and the reformer 300 is not shown.

The flow and mixing process of the AOG and the oxidation fuel are described with reference to FIG. 4. Here, in one embodiment, LPG, a hydrocarbon-based fuel, can be used the oxidation fuel, and air can be used as the oxidizer. On the other hand, the AOG, as described above, contains a large amount of hydrogen that is discharged without reacting with the fuel electrode of the fuel cell. Since the hydrogen is very highly reactive, backfire is likely to be generated when the AOG is directly supplied into the oxidizing unit. Therefore, it is possible to reduce the probability of backfire by mixing the AOG containing a large amount of highly-reactive hydrogen with oxidation fuel having relatively low reactivity (e.g. gas mixture of LPG and air) and supplying the mixture into the oxidizing unit.

In addition, because the hydrogen is very small in molecular weight, its diffusion speed is very high. Therefore, the AOG has a higher diffusion speed than the oxidation fuel when the AOG and the oxidation fuel are supplied under the same pressure. Accordingly, as shown in FIG. 4, the AOG is mixed with the oxidation fuel discharged from the oxidation fuel nozzles 112 and then flows into the oxidizing portion 210 after being supplied from the AOG nozzle 111 into the oxidizing unit 200. In this operation, as described above, the hydrogen-rich AOG gas has a high diffusion speed, such that when the AOG gas is injected into oxidation fuel having large concentration, the AOG and the oxidation fuel are sufficiently mixed before reaching the oxidizing portion 210. As a result, the mole fraction of the hydrogen in the mixture of the AOG and the oxidation fuel is reduced due to the addition of the oxidation fuel and thus the probability of backfire is correspondingly reduced.

The mixing ratio of the AOG and the oxidation fuel can be adjusted by adjusting the diameter of the AOG nozzle 111, and adjusting the diameter and the number of the oxidation fuel nozzles 112, under assumption that the supply pressures of the AOG and the oxidation fuel are the same. In other words, as the diameter of the AOG nozzle 111 increases, the mixing ratio of the AOG increases, and as the diameter or the number of the oxidation fuel nozzles 112 increases, the mixing ratio of the oxidation fuel increases. However, the size of the AOG nozzle 111 cannot be made too large due to the increased possibility of backfire, whereas when the AOG nozzle 111 is made too small in size, the amount of AOG supplied becomes too small, which also causes a problem. In some embodiments, the AOG nozzle 111 has a maximum diameter of 2.5 mm, in consideration of the possibility of backfire and the amount of AOG supplied, and the oxidation fuel nozzles 112 have a maximum diameter of 1.5 mm.

The diameters and the number of oxidation fuel nozzles 112 can be determined in accordance with the area of the AOG nozzle 111 and the mixing ratio. In some embodiments, the oxidation fuel is supplied in a proportion of one to three and a half times the volume of the AOG.

For example, when the diameter of the AOG nozzle 111 is 2.5 mm and the mixing ratio of the AOG and the oxidation fuel is 1:2, then twelve oxidation fuel nozzles 112 each having a diameter of 1 mm around the AOG nozzle 111 would supply the desired mixing ratio. In this case, the discharge areas of the nozzles are:

$$AOG \text{ discharge area} = (1.25)^2 \times \pi = 1.5625\pi$$

$$\text{Oxidation fuel discharge area} = 12 \times (0.5)^2 \times \pi = 3\pi$$

In addition, the oxidation fuel nozzles 112 may be disposed at a regular distance (or spacing) such that the AOG and the oxidation fuel are uniformly mixed, in order to prevent or protect from channeling in the thermal distribution in operating the oxidizing unit 200 due to disproportionate (or substantially uneven) distribution of the hydrogen.

EXAMPLE 2

Another embodiment of the present invention is described with reference to FIGS. 5 to 7. This embodiment relates to the lower structure of an oxidizing unit which reinforces mixing of (or further mixes) the AOG and the oxidation fuel.

An oxidizing unit 200a according to this embodiment is closed at its lower end by a nozzle plate 110 and has an oxidizing unit lower plate 203 disposed at a distance (e.g., a predetermined distance) from a nozzle plate 111 of an oxidizing unit body 201 to close the lower portion of the oxidizing unit body 201. Therefore, a circular plate-shaped (or disk shaped) space can be defined between the oxidizing unit plate 203 and the nozzle plate 110. Further, mixed oxidation fuel nozzles 205 are formed through the oxidizing unit lower plate 203. The mixed oxidizing fuel nozzles 205 are disposed at a distance (e.g., a predetermined distance) from the reformer lower plate 303 and is biased toward or closer to the oxidizing unit body 201.

In this structure, the diameter of the nozzle plate 110 of the burner nozzle assembly 100 is determined such that the nozzle plate 110 can be inserted in a small gap from under the oxidizing unit body 201. A stepped portion 113 (see FIG. 1) having a larger diameter than the nozzle plate 110 is formed around the nozzle plate 110 such that the nozzle plate 110 is inserted by a depth (e.g., a predetermined depth) into the oxidizing unit body 201. In one embodiment, it is preferable to combine (or join) the nozzle plate 110 and the oxidizing unit body 201 and then seal it by welding.

Figure 5:
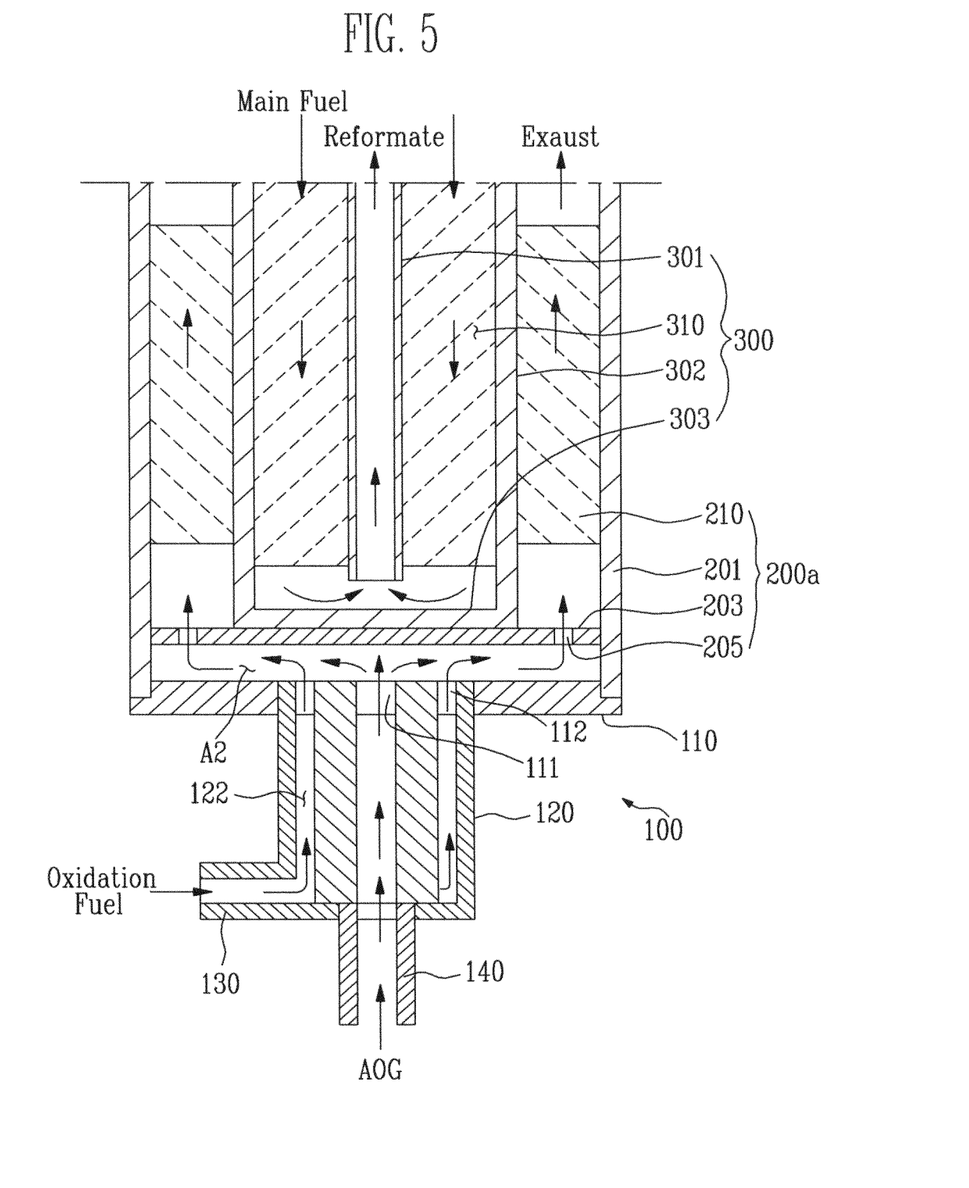
FIG. 5 is a schematic cross-sectional view showing a fuel converter according to another embodiment of the present invention.

When the nozzle plate 110 and the oxidizing unit body 201 are combined (or joined) as shown in FIG. 5, a space (e.g., a predetermined space) A2 having a circular plate (or disk) shape is defined between the nozzle plate 110 and the oxidizing unit lower plate 203.

Figure 6:
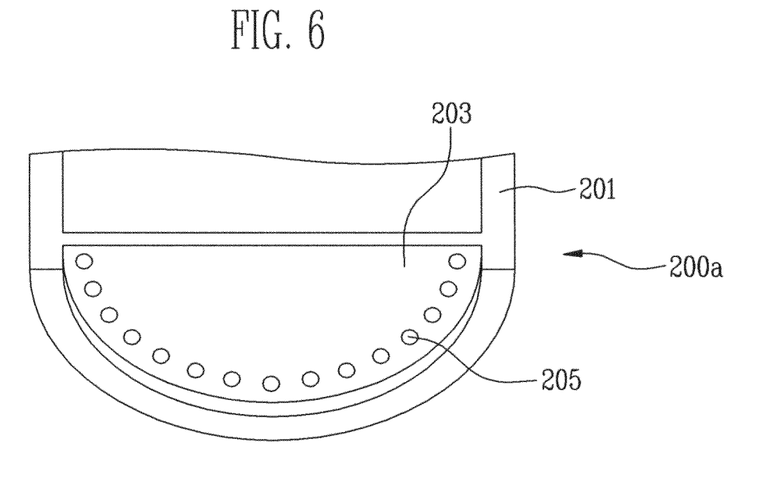
FIG. 6 is a perspective view of a bottom surface of the body of an oxidizing unit.

FIG. 6 is a perspective view of a bottom surface of the body of an oxidizing unit.

As described above, the AOG and the oxidation fuel are mixed while flowing to the oxidizing portion 210 through the channel, in which the outlet of the mixing space A2 is blocked by the oxidation fuel nozzle 205, such that the number of collisions of the molecules in the AOG and the oxidation fuel is increased. Accordingly, the AOG and the oxidation fuel can be mixed more easily (or more thoroughly) than in Example 1.

The diameters of the mixed oxidation fuel nozzles 205 depend on the amount of mixed oxidation fuel supplied. That is, in one embodiment, the total area of the mixed oxidation fuel nozzles 205 is preferably one to four times the sum of the total area of the AOG nozzle and the oxidation fuel nozzles. When it is less than the total area of the AOG nozzle and the oxidation fuel nozzles, unnecessary pressure is generated in the region A2, and when it is more than four times that area, the effect of mixing by the nozzle is reduced. For example, when the AOG nozzle 111 has a diameter of 2.5 mm and when there are twelve oxidation fuel nozzles 112 each having a diameter of 1 mm, there can be thirty mixed oxidation fuel nozzles 205 each having a diameter of 1.5 mm. In this case, the total area of the AOG nozzle 111 and the oxidation fuel nozzles 112 is $4.5625\pi$ and the total area of the mixed oxidation fuel nozzles 205 is $16.875\pi$, which is about four times the sum of the area of the AOG nozzle 111 and the oxidation fuel nozzles 112.

Figure 7:
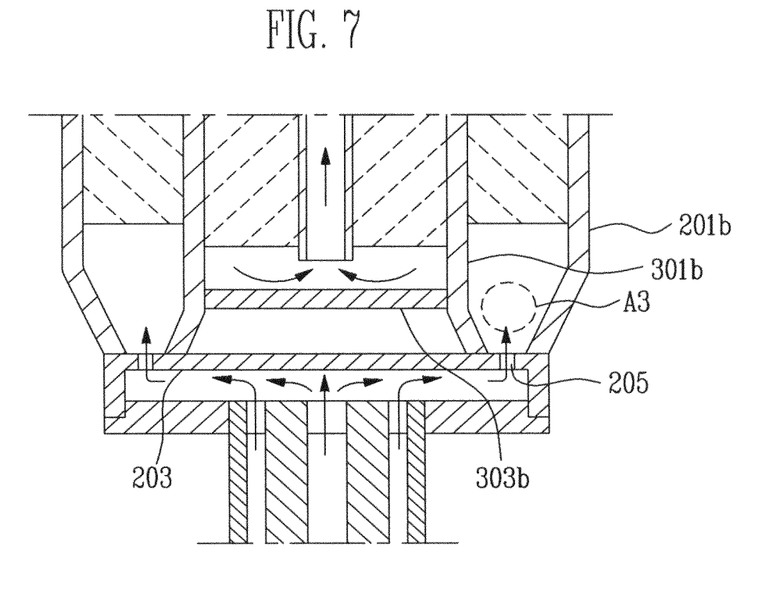
FIG. 7 is a schematic cross-sectional view showing a fuel converter according to another embodiment of the present invention.

On the other hand, as shown in FIG. 7, the AOG and the mixed fuel are first mixed by collision of supplied gases around each nozzle and then secondarily mixed while flowing to the mixed oxidation fuel nozzles 205 through the channel.

EXAMPLE 3

Another embodiment of the present invention is described with reference to FIG. 7. In this embodiment, the space around the mixed oxidation fuel nozzles 205 is narrowed, as compared with Example 2.

In this embodiment, the lower end of an oxidizing unit body 201b is bent inside (or angled toward the central axis of the reformer) and the lower end of a first part 301b is bent outside (or angled away from the central axis of the reformer); thereafter, the lower end of the oxidizing unit body 201b is sealed by attaching a nozzle plate 110. The lower end of the oxidizing body 201b and the lower end of the first part 301b define a first cross sectional annular area distal to the mixed fuel nozzles and a second cross sectional annular area, smaller than the first cross sectional annular area, proximal to the mixed fuel nozzles. The lower end of the oxidizing body 201b and the lower end of the first part 301b also define a third area between the first area and the second area, the third area being larger than the second area and the first area being larger than the third area. In order to prevent unnecessary space from being defined or formed under the first part 301b, it is possible to seal the lower end of the first part 301b by providing a reformer lower plate 303b at a height (e.g., a predetermined height).

According to this configuration, it is possible to make a space A3 that gradually becomes wider from the outlet of the mixed oxidation fuel nozzle 205. When the mixed oxidation fuel is discharged from the mixed oxidation fuel nozzle 205 and passes through the space A3, the gas concentration is reduced and the flow speed of the fuel mixture is relatively high, because the space is narrow around the nozzle. This feature further reduces the possibility of backfire around the mixed oxidation fuel nozzle 205.

EXAMPLE 4

Figure 8:
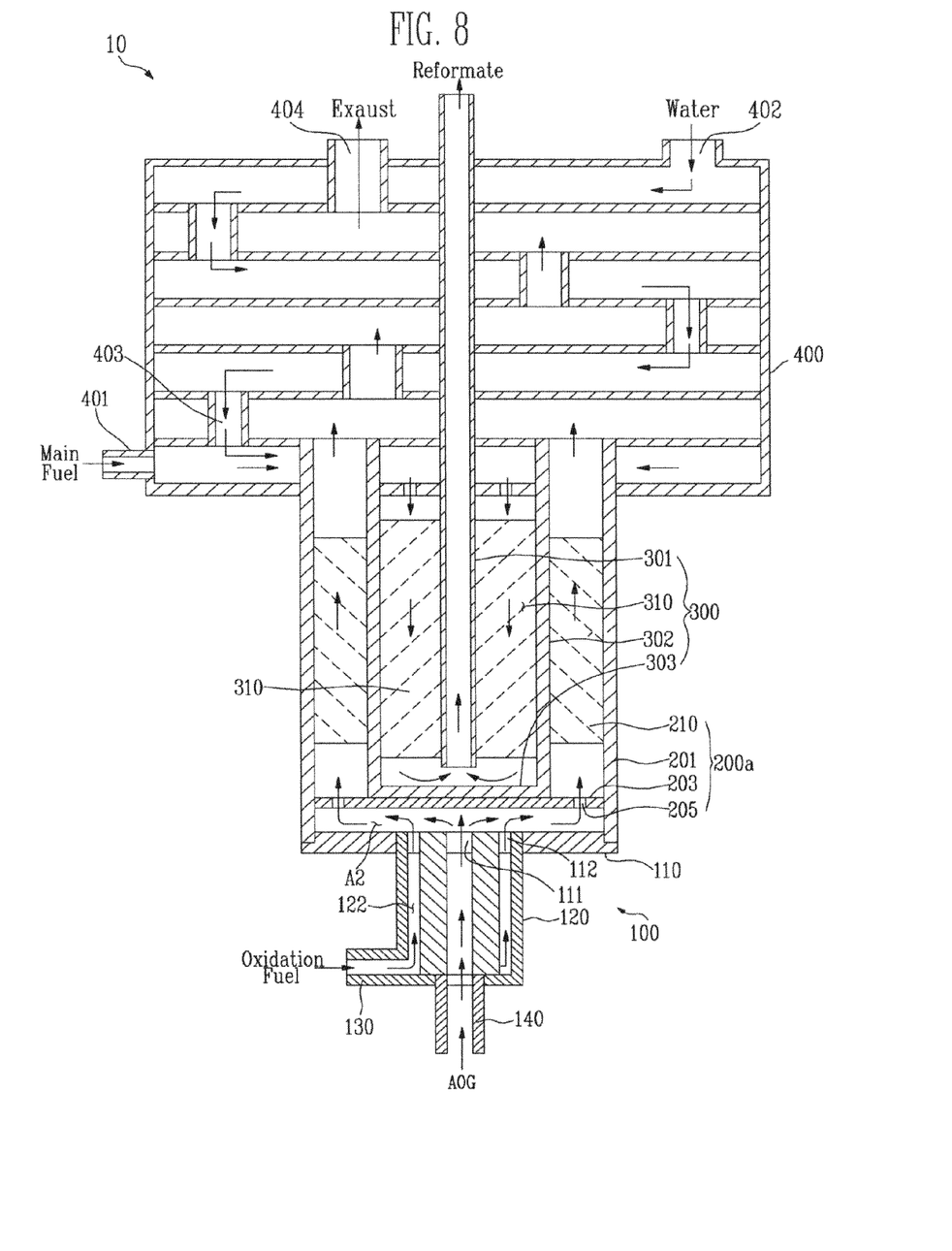
FIG. 8 is a schematic cross-sectional view showing an embodiment of the present invention in which an evaporator is included in a fuel converter.

Another embodiment which includes an evaporator 400 is described with reference to FIG. 8.

The evaporator 400 is provided to evaporate water supplied to the reformer 300 using the steam reforming method, using the thermal energy of the exhaust discharged from an oxidizing unit 200a. In this embodiment, the evaporator 400 has a structure in which a step along which water flows and a step through which the exhaust flows are alternately disposed to increase the heat exchange efficiency of the exhaust.

The AOG and the oxidation fuel are supplied through the AOG nozzle 111 and the oxidation fuel nozzles 112, respectively, mixed in a space A2 defined between the oxidizing lower plate 203 and the nozzle plate 110, and then discharged through the mixed oxidation fuel nozzle 205. The discharged mixed oxidation fuel is oxidized in the oxidizing portion 210 thereby generating heat, and the exhaust created after the oxidation converts the water supplied from a water supplier 402 into steam by transmitting the remaining heat to the evaporator, and the exhaust is then discharged through an exhaust outlet 404 of the evaporator 400. The converted steam is mixed with main fuel supplied from main fuel inlet 401 through a connecting pipe 403 and then flows to a reformer 300.

The main fuel and the steam are converted into a hydrogen-rich reformate by the steam reforming method and then flows through a first part 301 to a reactor for reducing carbon monoxide or the fuel electrode of the fuel cell.

Figure 9A:
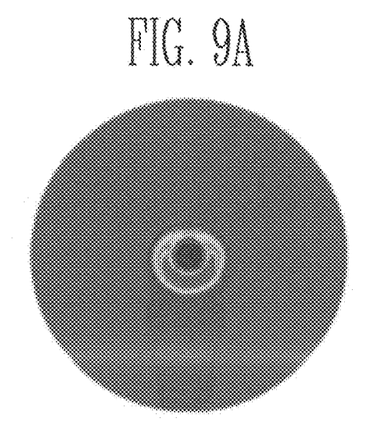
FIGS. 9A and 9B are thermal distribution diagrams comparing the distribution of thermal energy on a nozzle plate according to a comparable nozzle plate (FIG. 9A) and an embodiment of the present invention (FIG. 9B).
Figure 9B:
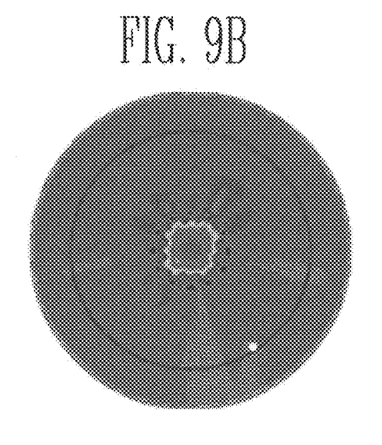

A thermal distribution diagram on the nozzle plate 110 in the operation of the reformer having the above configuration is shown in FIG. 9B. As shown in FIG. 9, the thermal balance is more uniform in thermal distribution diagram when using the configuration of the burner nozzle assembly 100 of embodiments of the present invention (FIG. 9B) than when using a comparable burner nozzle assemblies (FIG. 9A). Therefore, the AOG and the oxidation fuel appear to be more uniformly mixed by embodiments of the present invention.

Although preferred embodiments of the present invention were described above, the scope of the present invention is not limited to the preferred embodiments and can be implemented by a variety of nozzle assemblies and reformers having the nozzle assemblies without departing from the scope of the present invention described in claims, and equivalents thereof.

What is claimed is:
1. A reformer comprising:
   a reforming unit;
   an oxidizing unit surrounding the reforming unit; and
   a burner nozzle assembly configured to mix an anode off-gas (AOG) with an oxidation fuel and to supply the mixed AOG and oxidation fuel to the oxidation unit, the burner nozzle assembly comprising a nozzle plate having an AOG nozzle at the center of the nozzle plate to supply the AOG to the oxidation unit and a plurality of oxidation fuel nozzles surrounding the AOG nozzle to supply the oxidation fuel to the oxidation unit, wherein the AOG nozzle has a diameter not greater than 2.5 mm, and each of the oxidization fuel nozzles has a diameter not greater than 1.5 mm and extends along a direction substantially parallel to a central axis of the nozzle plate having substantially the same diameter throughout a thickness of the nozzle plate; the burner nozzle assembly further comprising a channel unit coupling the AOG nozzle with an AOG introducer to allow the AOG to flow therebetween and coupling the oxidation fuel nozzles with an oxidation fuel introducer to allow the oxidation fuel to flow therebetween.

2. The reformer of claim 1, wherein the reforming unit comprises:
   a first part;
   a second part; and
   a reforming-reacting portion between the first part and the second part and configured to convert a main fuel into a reformate, the second part surrounding the first part and having a closed end portion facing the burner nozzle assembly, the first part having an open end portion facing the closed end portion of the second part and being configured to discharge the reformate.

3. The reformer of claim 2, wherein the oxidizing unit comprises:
   an oxidizing unit body surrounding the second part of the reforming unit; and
   an oxidizing portion between the second part of the reforming unit and the oxidizing unit body.

4. The reformer of claim 3, wherein the oxidizing portion comprises an oxidizing catalyst.

5. The reformer of claim 2, wherein the nozzle plate of the burner nozzle assembly is separated from the closed end portion of the reforming unit by a gap therebetween and seals an end of the oxidizing unit.

6. A reformer comprising:
   a reforming unit;
   an oxidizing unit surrounding the reforming unit; and
   a burner nozzle assembly configured to mix an anode off-gas (AOG) with an oxidation fuel and to supply the mixed AOG and oxidation fuel to the oxidation unit,
   wherein the burner nozzle assembly comprises a nozzle plate having an AOG nozzle at the center of the nozzle plate to supply the AOG to the oxidation unit and a plurality of oxidation fuel nozzles surrounding the AOG nozzle to supply the oxidation fuel to the oxidation unit, and
   wherein the oxidizing unit comprises a mixed fuel plate facing the nozzle plate of the burner nozzle assembly and having a plurality of mixed fuel nozzles surrounding the center of the mixed fuel plate, the mixed fuel nozzles being separated from the nozzle plate of the burner nozzle assembly by a gap there between.

7. The reformer of claim 6, wherein the mixed fuel nozzles are further away from the central axis of the reformer than the oxidation fuel nozzles are away from the central axis of the reformer.

8. The reformer of claim 6, wherein:
   the oxidizing unit has a first end portion facing the burner nozzle assembly, the first end portion being angled toward the central axis of the reformer; and
   the reforming unit has a second end portion facing the burner nozzle assembly, the second end portion being angled away from the central axis of the reformer,
   wherein the mixed fuel nozzles are between the first end portion and the second end portion.

9. The reformer of claim 8, wherein the first end portion and the second end portion define a first cross sectional annular area distal to the mixed fuel nozzles and a second cross sectional annular area proximal to the mixed fuel nozzles, and the first area is larger than the second area.

10. The reformer of claim 9, wherein the first end portion and the second end portion further define a third area between the first area and the second area, the third area is larger than the second area, and the first area is larger than the third area.

11. The reformer of claim 6, wherein the sum of the discharge areas of the mixed fuel nozzles is one to four times the sum of the discharge areas of the oxidation fuel nozzles and the discharge area of the AOG nozzle.

12. The reformer of claim 1, further comprising an evaporator configured to apply heat of exhaust discharged from the oxidizing unit to convert water into steam and to supply the steam into the reforming unit.

13. The reformer of claim 1, wherein the sum of the discharge areas of the oxidation fuel nozzles is one to three and a half times the discharge area of the AOG nozzle.

14. A reformer comprising:
    a reforming unit;
    an oxidizing unit surrounding the reforming unit; and
    a burner nozzle assembly configured to mix an anode off-gas (AOG) with an oxidation fuel and to supply the mixed AOG and oxidation fuel to the oxidation unit,
    wherein the burner nozzle assembly comprises a nozzle plate having an AOG nozzle at the center of the nozzle plate to supply the AOG to the oxidation unit and a plurality of oxidation fuel nozzles surrounding the AOG nozzle to supply the oxidation fuel to the oxidation unit and each of the oxidation fuel nozzles extends along, a direction substantially parallel to a central axis of the nozzle plate and has substantially the same diameter throughout a thickness of the nozzle plate, and
    wherein the sum of the discharge areas of the oxidation fuel nozzles is one to three and a half times the discharge area of the AOG nozzle.

* * * * *